United States Patent [19]

Leto

[11] 4,419,026

[45] Dec. 6, 1983

[54] INTERNAL LOCKING DEVICE FOR TELESCOPIC ELEMENTS AND METHOD OF MAKING THE SAME

[76] Inventor: Alfonso Leto, 12255 Gerald Ave., Granada Hills, Calif. 91344

[21] Appl. No.: 182,025

[22] Filed: Aug. 28, 1980

[51] Int. Cl.$^3$ .................... F16B 7/10; F16D 1/12
[52] U.S. Cl. ..................... 403/104; 403/109; 403/343; 403/DIG. 7; 403/351
[58] Field of Search ............. 403/104, 109, 34.3, 403/DIG. 7, 350, 351, 352

[56] References Cited

U.S. PATENT DOCUMENTS

| | | | |
|---|---|---|---|
| 2,461,625 | 2/1949 | Benson | 403/350 X |
| 2,884,270 | 4/1959 | Carlberg | 403/104 X |
| 3,295,872 | 1/1967 | Kragle | 403/350 |
| 3,515,418 | 6/1970 | Nielson | 403/352 X |
| 3,795,453 | 3/1974 | Condevaux | 403/343 X |

FOREIGN PATENT DOCUMENTS 118968  9/1944  Australia ..................... 403/350

*Primary Examiner*—Wayne L. Shedd
*Attorney, Agent, or Firm*—Harlan P. Huebner

[57] ABSTRACT

An internal locking device for telescoping tubular members and method of forming the same. The device includes an inner telescoping member, having an end formed with an annular cam groove of a selected configuration, and a cam element cooperating with said cam groove and outwardly extendable to form a releaseable lock of an outer telescoping tubular member with the inner member when the members are twisted one with the other.

7 Claims, 16 Drawing Figures

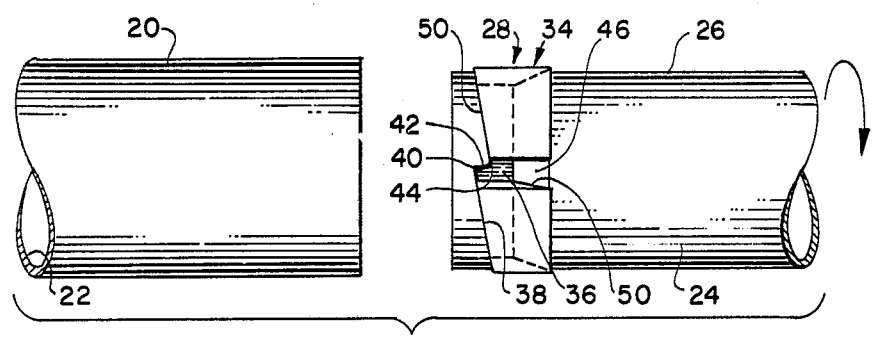
FIG. 1.
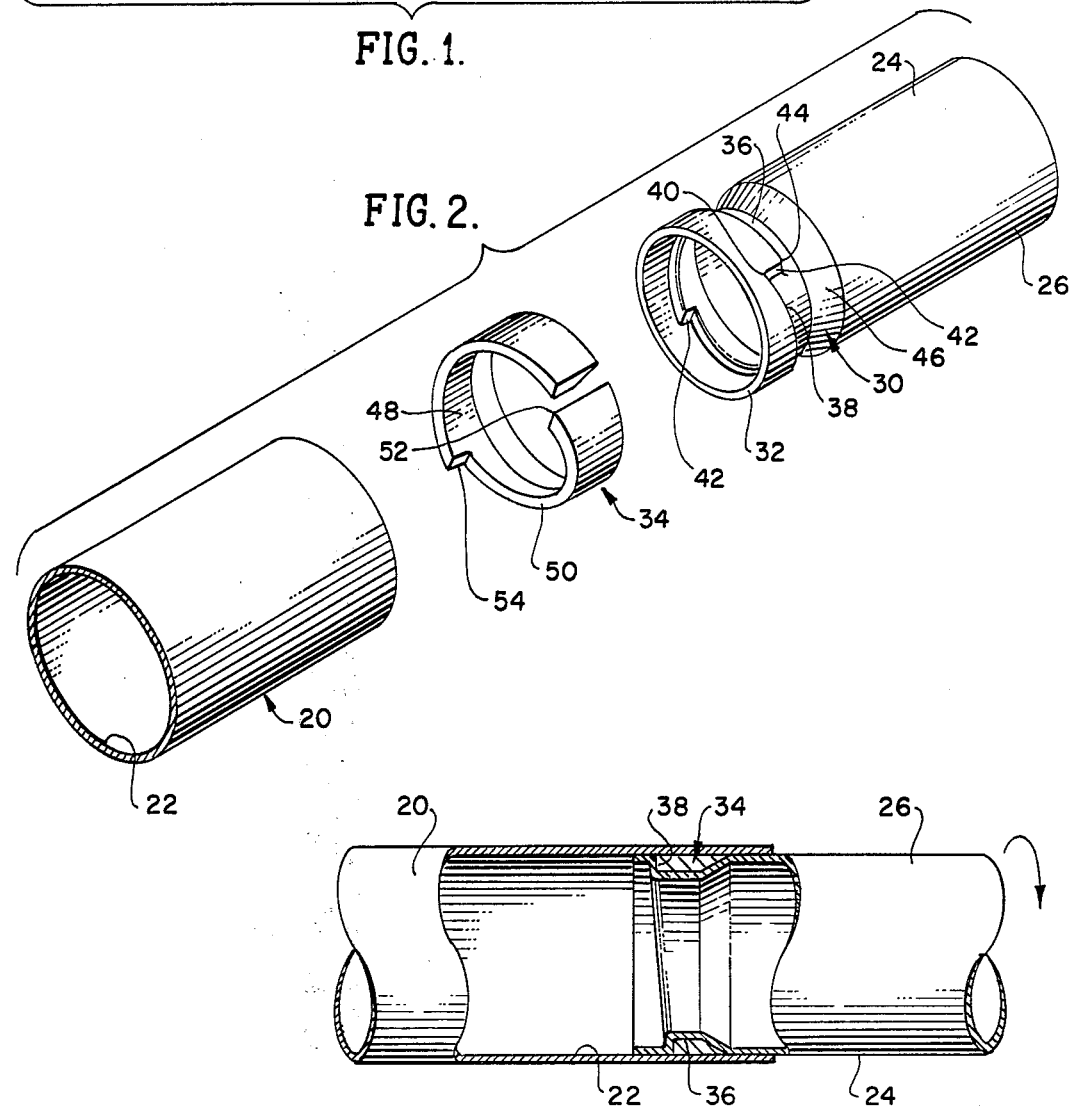
FIG. 2.
FIG. 3.

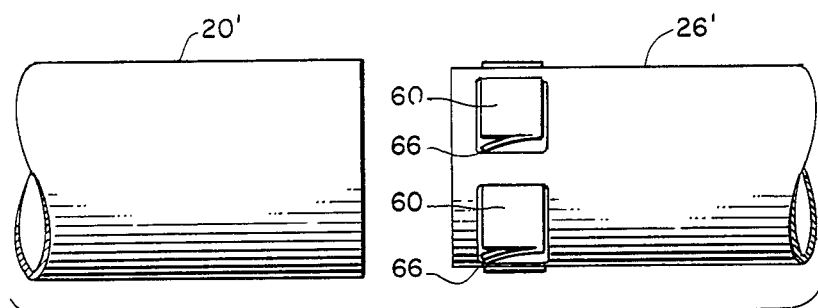
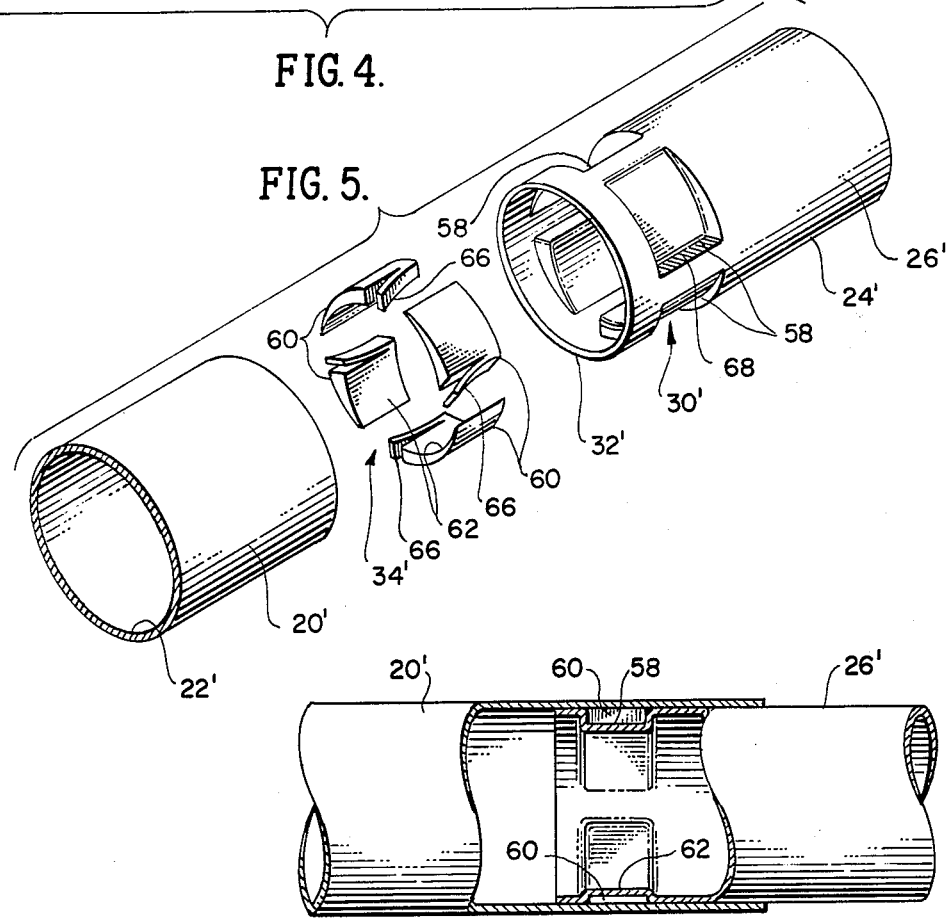
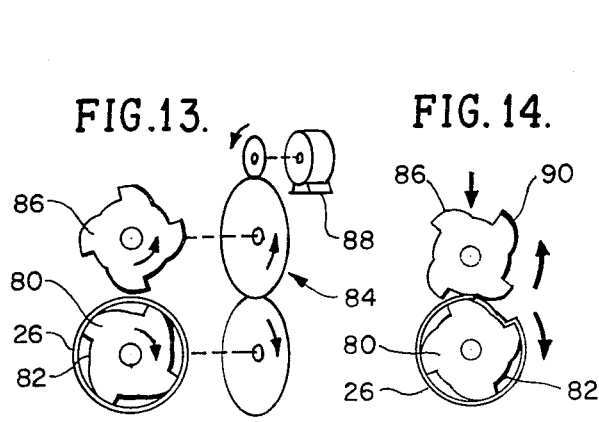
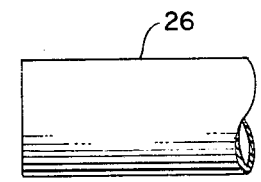
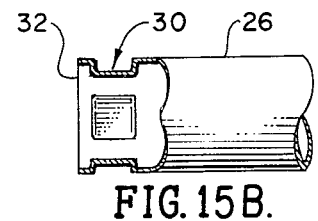

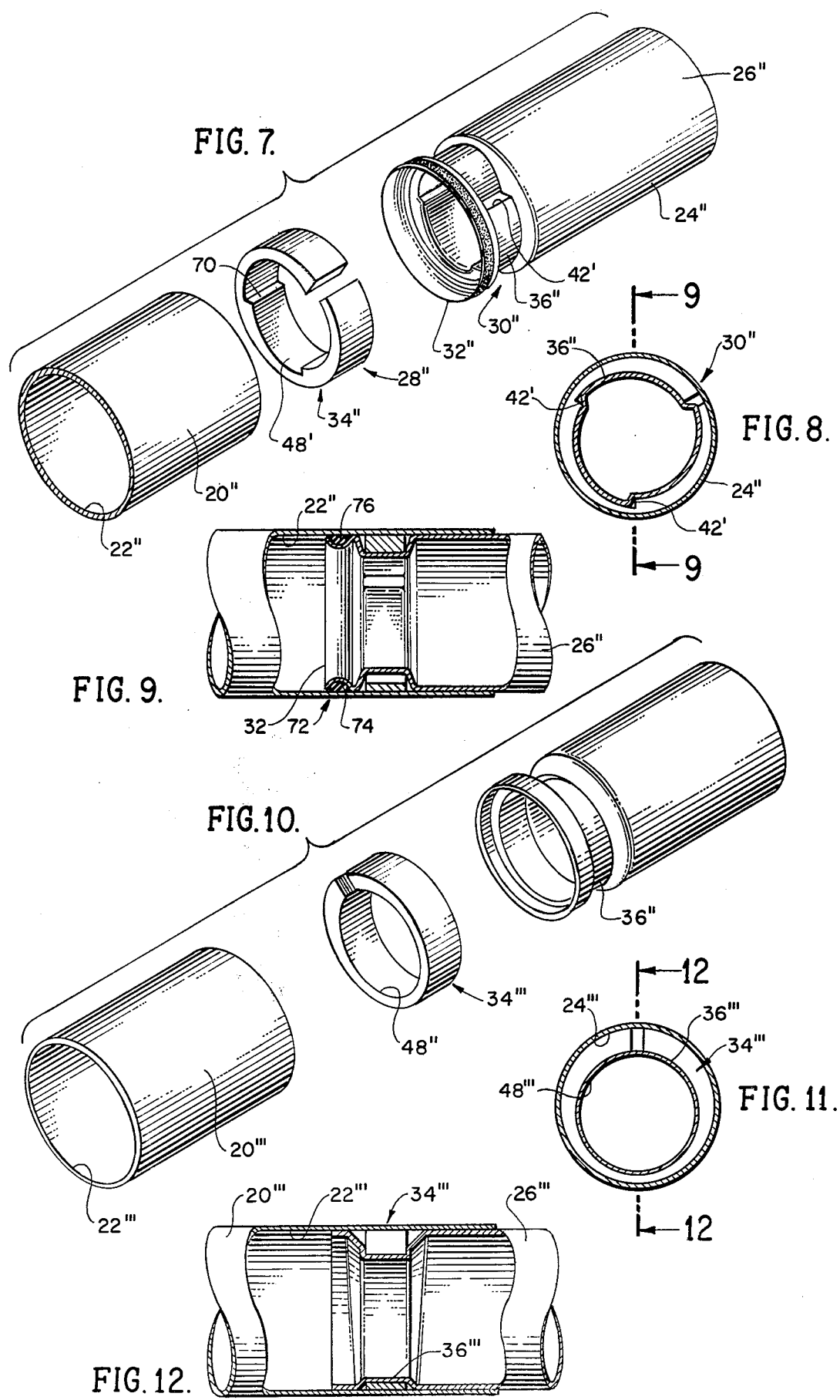

INTERNAL LOCKING DEVICE FOR TELESCOPIC ELEMENTS AND METHOD OF MAKING THE SAME

BACKGROUND OF THE INVENTION

This invention relates to an internal locking mechanism for telescoping tubular members which utilizes friction to lock one telescoping member to another and method of making the same.

Heretofore, internal locking mechanisms that have been employed with telescoping members have required a cam surface mounted on a separate element or mandrel that is secured to the end of the inner telescoping member, so that as the pole is rotated the cam will bear against the outer telescoping member such as illustrated in U.S. Pat. No. 3,515,418. This requires two or more parts to construct in addition to the tubular telescoping members and the securing or fastening the separate parts into the inner tube member. Hence this device is weak due to the securement of one piece to another. In other words the twisting action can break the connection. Further, in applications where fluids will pass through the tubular members, the point of securement of the separate elements requires a seal to prevent leakage at this point.

In addition to that, there are various other types of friction engagement locking means which utilize mandrels or plugs which are inserted and secured within one end preferably the smaller of a telescoping member which then slides into the larger telescoping member where appropriate fittings are utilized so that by the twisting of one telescoping member against the other the offsets or cams will engage the surface and lock the member in place. These devices can be found in U.S. Pat. Nos. 3,667,788; 3,596,946; 2,873,129; 2,473,531.

Such plugs or mandrel type of locking devices have structural disadvantages over the present invention. Inherently, the friction type of locking members have utilized a minimal of three working parts namely the mandrel or plug with its formed surface which is fitted to the end of the inner tube, a locking ring of some type mounted on the mandrel, both of which are either cammed or stepped and the insertion of the mandrel in an outer telescoping tube. This has many disadvantages in that the cost of producing the locking device is uneconomical since it has required the separate mandrel to be formed first and then it must be inserted and secured by some means within the telescoping member. In the case where fluids are to be transmitted through the telescoping tubes, a seal is required where the mandrel is fitted into the end of the inner tube.

In addition, the previous prior art, in some cases, has utilized plastic mandrels and rings which have had a tendency to weaken when torque is applied to the members to effect the necessary tension. Finally, when the mandrel has been secured within the tube by whatever means such as wedging etc., there is always the possibility that a twisting of one telescoping member against another to lock the telescoping members in place, will cause the loosening of the mandrel and therefore, the locking device will be defeated because the mandrel will rotate freely within the smaller telescoping member.

Further, with the mandrel or plug type of friction of locking means as found in the prior art, the mandrel or plug has been solid in construction or at least only having a very small aperture extending there through. This has precluded the use of telescoping members with internal frictional locking means for a conduit of fluids. Where the mandrel did have an axial bore or opening extending therethrough to allow fluids to enter, the mandrel would require considerable sealing in order to prevent fluid from seeping out between the tube and the locking mechanism.

In addition to the above cited patents, applicant is aware of the following U.S. Pat. Nos. 3,095,825; 3,044,410; 2,517,700; 2,494,878; and 3,953,138. None of these disclose the present invention.

SUMMARY OF THE INVENTION

As noted above there are distinct disadvantages in the prior art relating to mandrels which are formed separately and then secured within the telescoping member.

In the present invention the separate mandrel has been eliminated and one end of the inner telescoping member has been formed by appropriate die roller means to form the camming groove of the locking device, thus eliminating the need for the separate mandrel to be secured within the tube. This also would eliminate the need for sealing the mandrel where it is secured to the tube for fluid carrying applications.

It has been found in recent years that the rolling and forming of tubular members can produce a groove circumference at the end of a circular tube of a different configuration than purely smooth circular configuration.

Thus it is an object of my invention to create a friction locking means for telescoping members wherein the end of the inner telescoping member is formed with an appropriate camming surface or steps and a split ring or other type of friction means may be inserted over the camming surface for engagement with the camming surface and of a diameter slightly larger or eccentric diameter to be able to engage the inner surface of the larger outer telescoping member for locking.

Another object of creating such a camming surface such as described which is a continuation of the telescoping means is that it results in a more economical locking device because the additional plastic or metal materials forming the plug or mandrel used in the prior art has been eliminated. Further, there is no additional labor needed, because of the simple forming of the camming surface on the end of the telescoping tube replaces the crimping or otherwise securing operation normally required to secure the mandrel or plug within the body of the inner smaller telescoping member.

A further object of this invention is to provide an inner telescoping member and camming surface or groove combination wherein it renders the locking means stronger in compression because the walls of the single metal tubing are stronger than most mandrel locking members which are usually of plastic and inserted within the inner telescoping tube.

It is a further object of this invention to provide a device wherein it can stand greater locking torque than the prior art, since the cam surface is an integral part of and formed from the tubing wall and can drive the split ring or other friction device directly as opposed to the indirect drive of the friction device through an insert such as an mandrel which is placed inside of the inner tubing and can slip under certain circumstances.

It is a further object of this invention to provide a maximum axial opening through the tube in the area of the cam surface or groove, as an extension of the open telescoping tube itself. Thus with such an opening of the tubing when locked it may be utilized for the carrying of fluids unobstructed. Finally, when the telescoping members are used for the conveying of fluids with such a cam surface or groove extension, no seal is required between a mandrel and the tube, because the mandrel has been eliminated.

It is a further object of this invention to form a locking device with a camming surface on the end of a smaller diameter telescoping tube by die roller means, whereby the end of the tube is deformed to the desired configuration without blocking or restricting the axial bore through the tube.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

These advantages may be more clearly understood from the following detailed description and by reference of the drawings in which:

FIG. 1 is a side elevational view of friction locking members for releasably locking telescoping members together;

FIG. 2 is a prospective exploded view of the friction locking means of FIG. 1;

FIG. 3 is a cross sectional view of the embodiment of FIGS. 1 and 2;

FIG. 4 is a side elevational view of a modified form of the invention including another type of friction locking means with camming surface and mating compression friction segments;

FIG. 5 is a cross sectional view of the embodiment of FIGS. 4 and 5;

FIG. 6 is a cross sectional view of the embodiment of FIGS. 4 and 5;

FIG. 7 is a prospective exploded view of another modified form of the invention including another type of friction locking means with stepped camming surface and mating split friction ring;

FIG. 8 is a cross sectional view of the modified friction locking means of FIG. 7;

FIG. 9 is a cross sectional view taken on line 9—9 of FIG. 8;

FIG. 10 is a prospective exploded view of yet another modified form of the invention;

FIG. 11 is a cross sectional view of the locking means of FIG. 10;

FIG. 12 is a cross sectional view taken on line 12—12 of FIG. 11;

FIG. 13 is a schematic representation of a method of forming the camming surface on the inner telescoping tube;

FIG. 14 is a schematic representation similar to FIG. 13 showing a portion of the camming surface formed in the inner telescoping tube;

FIG. 15A is a side elevational view of a tube prior to deformation to form the camming surface; and FIG. 15B is a side elevational view of the tube of FIG. 15A formed showing the metal displaced.

DETAILED DESCRIPTION OF THE PREFERRED EMBODIMENT

Now referring specifically to FIG. 1, there is illustrated an application of the invention wherein two tubular members that are telescoped one within the other may be releasably locked together at a selected position by twisting one tubular member. There is provided a first or outer telescoping tubular member 20 which has an internal surface or diameter 22 slightly larger than the exterior diameter 24 of a second or inner telescoping tubular member 26. The member 26 is adapted to slide or telescope within the member 20.

The locking mechanism is generally designated 28. The mechanism 28 includes two parts, a camming groove or grooves generally designated 30 formed on the end 32 of the inner telescoping member 26 and a locking cam or ring generally designated 34 adapted to bias against the internal surface 22 of the outer telescoping member 20. The biasing is accomplished by exerting a twisting motion either clockwise or counterclockwise on one of the telescoping tubular members 20 or 26. In order to disengage the locking mechanism 28 a reverse twist is given to the member.

The camming groove 30 as stated above may be formed adjacent the end 32 of the member by means to be subsequently described. The groove 30 includes deforming material in the member 26 adjacent the end 32 so that there is an annular bottom surface 36 of a diameter less than the exterior diameter 24 of the member 26. The surface 36 is symmetrical with the surface 24 and extends outward terminating in the end 32 which is the same exterior diameter as the diameter 24. Preferably the surface 38 is tapered both upwardly and outwardly as best seen in FIGS. 2 and 3. The outward taper of cam surface 38 thickens from the end of 32 as it projects annularly from a point 40 at a stop 42, see FIG. 1, around the member 26 terminating at a point 44. Between the points 40 and 44 the stop 42 is formed projecting upward from the bottom surface 36.

In the preferred structure two stops 42 are formed by the tapered surface 38 diametrically oppose each other, see FIG. 2.

Rearwardly of the annular bottom surface 36, the groove 30 tapers outwardly forming a tapered conical surface 46, which melds into the exterior surface 24 of member 26.

Referring in more detail to the locking element or cam ring 34, it is preferably an annular ring which is split as best seen in FIG. 2. The element 34 includes an inner surface 48 which conforms to the bottom surface 36 and tapered conical surface 46 formed in the member 26. The ring 34 has a cam surface 50 which conforms with the front cam surface 38 of the groove 30. Additionally stops 52 and 54 are formed in the rings 34 to interrupt the cam surface and act with stops 42.

To assemble the locking mechanism 28 the locking cam ring 34 is flexed and inserted around the camming groove 30 as seen in FIGS. 1 and 3. The first or outer telescoping member 20 is then placed over the ring 34 and the second member 26.

In operation the ring 34 is resilient and actually flexes outwardly against the internal surface of member 20. In order to lock the respective telescoping members 20 and 26 the inner member 26 may be twisted in a clockwise or counterclockwise manner. With the twisting the ring 34 which frictionally engages inner surface 22 will remain generally fixed from rotation. However, as the cam surface 38 rotates it will bear against the cam surface 50 of the ring and urge the ring rearwardly. As the ring 34 moves rearwardly it will radially cam outward against the conical surface 46 thus biasing the ring tighter against the member 20 and the respective members will be releasably locked together.

When it is desired to unlock the members 20 and 26, a reverse twist is applied to the inner member 26 and the ring 34 will engage each other and prevent the biasing from freezing the members and thus prevent a release by hand motion.

In the modification of FIGS. 4, 5 and 6 the basic camming principal is applied as before. The main difference resides in the construction of the camming grooves 30' and the lock cam ring 34'.

The grooves 30' is constructed as four separate pockets or grooves 58 formed in the member 26' adjacent end 32'. Each groove 58 is peripherally tapered from the outer surface 24' annularly and inwardly as best seen in FIG. 5. The grooves 58 are each spaced around the member 26'.

The locking cam ring 34' includes four cam segments 60 which include an inner cam surface 62 tapered as is the groove 58. At the thick end 64 there is integrally molded with the segment 60 a cam spring 66.

When each cam segment 60 is placed in a respective camming groove 58 the member 20' is placed around the locking mechanism 28'. In operation as the member 26' is twisted the cam spring 66 will help to push the cam segments 60 away from the end wall 68 of the grooves and force the segments out of the groove into biasing contact with the inner surface 22' of the member 20' and lock the members 20' and 26' together.

The modification of FIGS. 7, 8 and 9 illustrate a third suggested locking mechanism 28". The camming groove 30" and locking cam ring 34" are similar to 30 and 34 with the change residing in the bottom surface 36" configuration and the interior 48' of the ring 34".

As best seen in the cross sectional view of FIG. 8 the bottom 36" is curved to form the cam surface. There are provided stops 42' on the bottom surface 36".

The ring 34" has a complimentary inner surface 48' corresponding with the bottom 36".

Thus when the ring 36" is fitted within the groove 30" the twisting or rotating of the inner member 26" will cam the ring 34" outwardly to bias and wedge against the internal surface 22" of the member 20". The ring 34" has stops 70 to engage the stops 42' and prevent "freezing" or overtorquing the members for permanent locking.

In addition this embodiment illustrates the use of a sealing means 72 whereby the telescoping members can be used as a fluid conduit. At the end 32" of the member 26" an annular arcuate groove 74 is formed to receive any form of conventional seal or O ring 76. Whereas here the locking means 34" is formed from the tube member 26" there is no need to include a second seal as with prior art locking means requiring a separate mandrel and seal where it is affixed to the member 26".

Another modification is shown in FIGS. 10, 11 and 12 directed to another shape for the camming surface 36'" and inner cam surface 48'". Here the ring 34'" will rotate and due to the offset cam surface 48'" will move outward to bias against the internal surface 22'" of the outer telescoping member 20'".

The preceeding description and FIGS. 1 through 12 are several illustrates of camming contours that can be used to achieve the desired releaseable locking for a pair of telescoping members 20 and 26. However, the invention is not to be limited to those embodiments. The only criteria necessary for the contours of the groove 30 is that they be other than truly round or that the position of the interior of the locking cam ring 34 be offset from the axis of the members 20 and 26.

In FIGS. 13, 14, 15 and 15a there is illustrated one method of preparing the camming groove or grooves 30 in the second or inner telescoping member 26 forming the heart of the invention. As can be seen from the prior art identified above, no telescoping locking member has ever considered or been able to deform the inner telescoping member to form the groove 30 of the locking mechanism 28.

However, the inventor has found that by the apparatus next described various annular bottom surfaces 36 of groove 30 can be formed from and within the members 26. This single unitary structure increases strength of the entire locking mechanism 28 because there is no separate mandrel formed to the desired profile and then affixed to the end of the member 26, and when members 20 and 26 carry fluids, the unitary structure cannot leak as is possible where a separate mandrel affixes to the end 32 of member 26.

One method of forming the end of the tubular member 26 is that which can be referred to as rotary swaging pressure roller and mandrel.

This method involves shaping the periphery of a mandrel 80 to a desired contour 82. In the case of FIG. 13 the configuration is that of FIG. 5. The mandrel 80 is geared by any conventional gear means 84 to a driven formed roller 86 and to a motor 88.

The driven formed roller 86 is formed with a reverse contour 90 from contour 82. In addition, the driven formed roller 86 is adapted by mechanism not illustrated to exert downward pressure on the roller 86.

In practice the second or inner telescoping member 26 is inserted over the mandrel 80 so that the end 32 is adjacent the contoured surface 82 and fixed to the mandrel 80. In order to form the camming groove or grooves 30 the activation of the motor 88 can by the gearing 84 inpart reverse rotation of the mandrel 80 and roller 86. In order to deform the smooth exterior 24 of member 26 pressure is applied downwardly to the roller 86 so that the reverse contour 90 engages and depresses the metal of member 26 to conform to the contour 82, as best seen in FIG. 14. As the mandrel 80 and roller 86 continue to rotate the configuration of the camming groove or grooves 30 is created.

The illustrations of FIGS. 15 and 15A show the before and after of the member 26.

While the rotary swaging pressure roller and mandrel method of creating the peripherial camming groove 30 distortions, various other types of forming equipment can be used. The contour of the member 26 can be formed by hydraulic bulging, explosive forming, electromagnetic forming as well as electrohydraulic forming, dies or other means. Further, should the shape of the groove 30 be exotic it may be that a combination of processes may be used to achieve the end result.

The main concern regarding the forming method is that it be sophisticated enough to create the camming groove 30 of any desired configuration and that it is not affixed to the second or inner telescoping member 26 but is formed therefrom as an integral single piece.

The invention and its attendant advantages will be understood from the foregoing description and it well be apparent that various changes may be made in the form and method of making, construction and arrangements of the parts without departing from the spirit and scope thereof or sacrificing its material advantages, the arrangements herein before described being merely by way of example. It do not wish to be restricted to the specific forms shown, methods or uses mentioned, except as defined in the accompanying claims, wherein various portions have been separated for clarity of reading and not for emphasis.

I claim:

1. An improved internal releasable locking device for telescoping tubular members wherein there is an outer telescoping member having an internal annular surface wherein the radii extending annularly therearound is equidistant from the central longitudinal axis of the member, and an arcuate locking cam element having an outer peripery generally complementary with the internal annular surface of the outer telescoping member and adapted to interfit within an inner telescoping member, the improvement comprising:

at least one camming groove formed in and as a part of said inner telescoping member adjacent an end thereof;

said groove having at least one surface spaced annularly inwardly of said outer annular surface that acts as a cam surface to cooperate with and move said arcuate locking cam in a direction radially outwardly from said groove whereby when said outer telescoping member is fitted over said locking cam element and said inner telescoping member, rotation of one of said telescoping members will cammingly urge said locking cam element into tight locking engagement against the internal annular surface of said outer telescoping member.

2. An improved releasable locking device as defined in claim 1 wherein:

the bottom wall of said groove has a radii extending therearound equidistant from said longitudinal axis;

one of said surfaces of said camming groove is a radially extending wall of a spiral configuration, relative to the longitudinal axis of said inner telescoping member which projects upward from said bottom wall; and another of said surfaces includes an outwardly tapered conical portion projecting outwardly from said bottom wall opposite said radially extending wall.

3. An improved releasably locking device as defined in claim 2 wherein:

said arcuate locking cam element includes a radially extending edge cam wall adapted to bear against said radially extending wall of a spiral configuration.

4. An improved releasable locking device as defined in claim 3 wherein said wall is adjacent the end of said inner telescoping member wherein rotation of one of said telescoping members either clockwise or counterclockwise will cause said locking cam element to move away from said end of said inner telescoping member and ride upwardly on said conical portion into locking engagement against said outer telescoping member.

5. An improved releaseable locking device as defined in claim 4 wherein:

said arcuate locking cam element is a split ring having an inner cam edge surface offset from the periphery of the inner telescoping member; and the wall of said camming groove in said inner telescoping member is of an offset configuration complementary with said surface of the split ring.

6. An improved releasable locking device as defined in claim 1 wherein there are a plurality of camming grooves formed in said inner telescoping member and there is an arcuate locking cam element seated in each of said camming grooves.

7. An improved releasable locking device as defined in claim 6 wherein said locking cam elements include spring means adapted to bias against a portion of said camming grooves to urge said cam elements radially outwardly upon rotation of one of said telescoping members.

* * * * *